United States Patent [19]

Nose

[11] Patent Number: 5,667,309

[45] Date of Patent: Sep. 16, 1997

[54] BEARING SEAL SYSTEM

[75] Inventor: Tamotsu Nose, Nagano, Japan

[73] Assignee: Sankyo Seiki Mfg. Co., Ltd., Nagano-ken, Japan

[21] Appl. No.: 557,845

[22] Filed: Nov. 14, 1995

[30] Foreign Application Priority Data

| Nov. 15, 1994 | [JP] | Japan | 6-305584 |
| Nov. 29, 1994 | [JP] | Japan | 6-319194 |
| Dec. 6, 1994 | [JP] | Japan | 6-330228 |
| Dec. 9, 1994 | [JP] | Japan | 6-331748 |

[51] Int. Cl.$^6$ ............... F16C 32/06; F16C 33/72
[52] U.S. Cl. ............... 384/132; 384/133; 277/80
[58] Field of Search ............... 384/107, 114, 384/119, 124, 132, 133; 277/80

[56] References Cited

U.S. PATENT DOCUMENTS

| 4,883,367 | 11/1989 | Maruyama | 384/133 X |
| 4,890,850 | 1/1990 | Raj et al. | 277/80 |
| 5,112,142 | 5/1992 | Titcomb et al. | 384/107 |
| 5,145,266 | 9/1992 | Saneshige et al. | 384/132 X |
| 5,372,432 | 12/1994 | Ishikawa | 384/133 |
| 5,423,612 | 6/1995 | Zang et al. | 384/132 X |
| 5,427,456 | 6/1995 | Hensel | 384/112 |

*Primary Examiner*—Thomas R. Hannon
*Attorney, Agent, or Firm*—McAulay Fisher Nissen Goldberg & Kiel, LLP

[57] ABSTRACT

A bearing seal system having a bag structure in a first embodiment wherein (1) oil is filled in a tapering bag space section positioned from the bag section to an exit section; (2) the space in the tapering space section is kept to 0.8 mm or less the slope angle of the outer end of the tapering space section is kept to 45° or less. In this way, oil is kept from air and a stable no-leak status is made possible; (3) the capacity of the tapering space section is made larger than that of a bag section or a radial bearing section in order to retain oil in the bearing section at all times and to prevent oil from leaking as a result of variations in the quantity of oil injected or in the capacity; and (4) the space ratio of the inner end and the outer end of the tapering space section is made larger to prevent oil from moving to the bearing section even when air migrates into the oil surface. In a second embodiment, the tapering space section where the surface of lubrication oil is injected can be at two places at both ends of a radial bearing section or at both ends of a bearing with a radial bearing section and a third bearing section. A third embodiment is disclosed.

21 Claims, 9 Drawing Sheets

BEARING SEAL SYSTEM

BACKGROUND OF THE INVENTION a) Field of the Invention

This invention relates to a bearing seal system which prevents lubrication oil from leaking outside the bearing section where the oil lubricates a bearing to relatively rotatably support a rotating member against a fixed member.

b) Description of the Related Art

In recent years, a variety of bearings using oil as a lubricant such as genetic "slipping bearings" and hydrodynamic pressure bearings have been proposed. As an example of these products using such bearings, a motor for a hard disk drive system (HDD) of the fixed-shaft type is illustrated in FIG. 20. This motor has a rotatable hub 4 installed on a fixed shaft 2, which is fixed on a frame 1 via a radial bearing 3, so that a rotation lubrication oil is supplied to the space between fixed shaft 2 and radial bearing 3. The oil is retained inside the bearing section of the radial bearing 3 by capillary action.

Various rotation systems, in which a shaft rotates with lubrication oil such as a motor rotation shaft, always require oil leak prevention measures. Particularly, oil leakage is a serious problem for the bearings in HDD motors or laser beam printer (LBP) motors in which cleanliness is critical. The conventional bearing system is one in which oil is adhered only in the space of the bearing section by capillary action or a special sealing mechanism is used to prevent oil from leaking. However, these conventional technologies, for example, hydrodynamic pressure bearings, are unable to obtain a functional lubrication, such as a hydrodynamic pressure, when little lubrication oil is supplied and oil leaks when too much oil is supplied without appropriate oil leak prevention measures. Also in the conventional technology, the bearing seal system does not take into account external forces such as gravity, vibration, impact, centrifugal force, hydrodynamic pressure, atmospheric pressure, temperature and other pressures. This results in a system with poor dependability.

OBJECT AND SUMMARY OF THE INVENTION

It is a primary object of the present invention to provide a bearing seal system which takes into account the following:

(1) a structure wherein a bearing has a space for taking into account the change in oil quantity injected and/or moved and oil is retained stably;

(2) a structure in which oil does not come out when exposed to external forces (gravity, vibration, impact, centrifugal force, hydrodynamic pressure, atmospheric pressure, temperature and other pressures) and is resistant to external forces;

(3) a structure in which oil does not move easily;

(4) a structure in which the oil surface on the exit side, on the outer side from the bearing section is secured and oil leakage is prevented; and (5) a structure in which oil is not mixed with air easily in order to provide a bearing seal system which:

(1) retains oil in the bearing section at all times to satisfy required bearing properties and
(2) is oil leak tight.

Before describing examples of this invention, inventive principles that inventors found through their elaborate research are disclosed to assist understanding this invention.

To retain oil in a bearing with the structure of having two opposing exits like that of a general radial bearing, oil is retained by balancing the capillary suction pressure and its surface position is determined. This status is balanced by two pressures: oil moves to a balancing position when some pressure is added from one side. For example, oil moves from the position A=B to the position wherein (A=B+ external pressure), and oil stays where the pressures are balanced.

As such, in the structure having two exits, the oil position in a bearing is determined by pressure balance; therefore, (1) oil moves whenever external pressure is added; a space is needed to retain oil in order to prevent oil from leaking during moving. It is highly probable that repeated oil movement invites air into the oil;

(2) oil retention pressure generated by capillary action is inversely proportional to the distance between the tapering space section and the shaft because the minimum tapering space section is normally regulated by the tapering space of the bearing section, thus increasing oil retention pressure is limited.

As a result of investigation for resolution of these issues, the inventors concluded that a bearing seal system having a bag structure (in which one of the two exits is closed as if one side of a cylindrical bag is closed) as illustrated in Example 1 provides structural effects as described below; unlike the structure having two exits, the bag in this system acts like a wall with which one atmospheric pressure is generated and is retained on the opposite side:

(1) oil does not move even when external force is added, thus minimizing the oil retention space and decreasing the probability of allowing air into the oil, (2) oil is retained with as large as 1 atm, thus enhancing the retention property against external pressures.

To realize these goals, a bearing seal system having a bag structure of a first example of this invention is configured as follows:

(1) oil is filled in the tapering space section positioned from the bag section to the exit section;

(2) the space in the tapering space section is kept to 0.8 mm or less and the slope angle of the outer end of the tapering space section is kept to 45° or less. In this way, oil is kept from air and a stable no-leak status is made possible;

(3) the capacity of the tapering space section is made larger than that of a bag section or a radial bearing section in order to retain oil in the bearing section at all times and to prevent oil from leaking as a result of variations in the quantity of oil injected or in the capacity, i.e., any capacity change due to coming out of a thrust bearing due to rotation or heat generation, and any oil capacity change due to evaporation or air migration;

(4) the space ratio of the inner end and the outer end of the tapering space section is made larger to prevent oil from moving to the bearing section even when air migrates into the oil surface; the pressure difference by the space ratio naturally pushes air out, thus resolving the mixing situation. With the tapering ratio, oil remains in a stable status at any point.

In another example of this invention, the tapering space section where the surface of lubrication oil is injected can be at two places at both ends of a radial bearing section like a generic radial bearing structure or at both ends of a bearing with a radial bearing section and a thrust bearing section.

In another example of this invention, the two oil exits intersect rectangularly against the rotation shaft, creating a quasi-bag structure to take its structural advantage: the tapering space section is formed at two oil exits and a hole is formed to allow both tapering space sections to communicate with each other in the axial direction, thus equaling the oil pressure and external pressure in order to obtain the same effect as that in the bag structure. This structure entirely supports the pressure generated by centrifugal force with the bag section.

For a better understanding of the present invention, reference is made to the following description and accompanying drawings while the scope of the invention will be pointed out in the appended claims.

DESCRIPTION OF THE PREFERRED EMBODIMENTS

The specific examples of a beating seal system of this invention which has been applied to a spindle motor for a HDD hard disk drive will be explained based on the annexed drawings.

Figure 1:
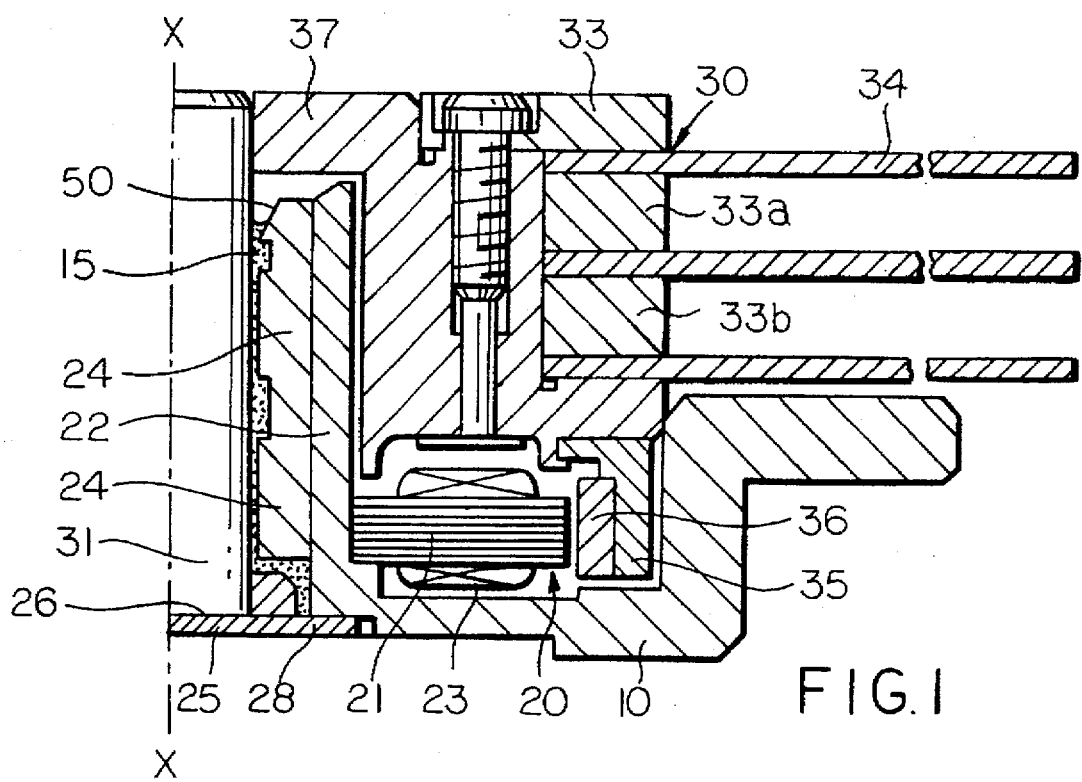
FIG. 1 illustrates a half cross section of the HDD motor structure of the first example of this invention.

A right half of an HDD spindle motor cross section taken from the rotation axis X—X is illustrated in FIG. 1. The spindle motor is comprised of a stator assembly 20 which acts as a fixed member assembled in a fixed frame 10 on the disk driving system and a rotor assembly 30 which acts as a rotating member assembled in layers against the stator assembly 20 from the upper side is shown in the figure. A stator core 21 constituting the stator assembly 20 is fitted onto the outer peripheral portion of a cylindrical bearing holder 22 installed in the center of the frame 10 and the salient-poles of the stator core 21 are wound with coil 23.

On the inner peripheral portion of the bearing holder 22, a radial bearing, comprised of a pair of radial lubrication bearings 24, arranged at certain intervals in the axial direction, is fixed and the rotation shaft is rotatably supported by the pair of radial lubrication bearings. On the inner peripheral surface of the radial lubrication bearings 24, a known radial hydrodynamic pressure generating groove is formed, frictionally facing the outer peripheral surface of the rotation shaft 31 via bearing oil 15, and the hydrodynamic lubrication surface consists of the inner peripheral surface of each of the radial lubrication bearing 24 and the outer peripheral surface of the rotation shaft 31.

The bottom end of the rotation shaft 31 is supported by the hydrodynamic thrust bearing comprised of a thrust backing plate 25 to cover the opening formed on the bottom end surface of the bearing holder 22 wherein the lubrication surface of the thrust backing plate 22 faces the bottom end of the rotation shaft 31 and a thrust bearing 26 with a thrust hydrodynamic pressure generating groove, as usual, formed on the lubrication surface. Within the thrust backing plate 25, the radial bearing with a pair of radial lubrication bearings 24 and the rotation shaft 31, a bag-shaped bag section 40 comprising a cylindrical path is formed; by filling the bearing seal space of the bag section 40 with oil 15, the rotation shaft 31 is supported freely and rotatably.

A hub 37 consisting of the rotor assembly 30 is bonded to the upper end portion of the rotation shaft in the figure to rotate with the shaft. The hub 37 is comprised of a cylindrical clamper 33 which is equipped with multiple magnetic disks 34 and spacer 33a and 33b, and is also equipped with a motor rotor driving magnet 36 on the hub 37 via a back yoke 35. The driving magnet 36 is circular and is positioned to face closely the outer peripheral end surface of the stator core 21.

Figure 2:
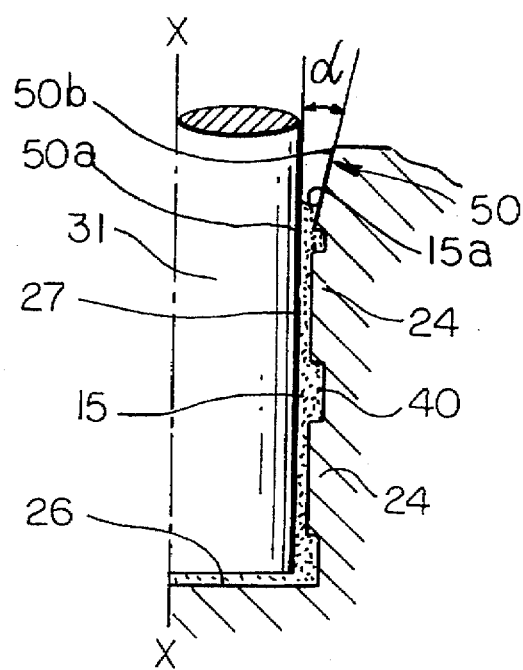
FIG. 2 illustrates a half cross section of the bearing seal system of the first example.

In this embodiment, a bearing section is specifically illustrated in FIG. 2; a tapering space section 50 is formed outside of the radial bearing 24; it is positioned on the outside in the axial direction in order to prevent the oil 15 from leaking. Liquid surface 15a of the oil 15, which acts as a bearing lubrication, fills the bag shaped bearing space which corresponds to the cylindrical bag section 40 (including the thrust bearing section, the radial bearing section, and the space between) and is designed to stay within the tapering space section 50.

The tapering space section 50 is composed as follows: In the tapering space section 50, the far inner end in the axial direction on the side of the radial bearing 24 side is the inner end of the tapering space section 50a; the section on the side of the radial bearing 24 away from the inner end of the tapering space section 50a is the bag section 40. The far outer end of the tapering space section 50 is the tapering space section outer end 50b and the outer side of the tapering space section outer end corresponds to the outer side of the tapering space section 50.

When the angle $\alpha$ of the tapering space section 50 at a predetermined position in the axial direction viewed from the side of the bag section 40 is defined as the slope angle of the tapering space section, when α=0°, the space is parallel to the rotation shaft surface, when the angle a which increases its degree to the outer side is defined as plus, and when the angle α which increases its degree to the bag section 40 is defined as minus, the space at the tapering space section 50 is set as follows:

the narrowest is the inner end of the tapering space section 50a, the widest is the outer end of the tapering space section 50b, and the slope angle α of the tapering space section from the tapering space section inner end 50a to the tapering space section outer end 50b is 0° or more. When the slope angle α of the tapering space section is 0°, the area parallel to the rotation shaft 31 may exist in pan of the area of the tapering space section 50.

When a space with the slope angle minus α exists between the tapering space section and the bearing section, the tapering space section inner end 50a corresponds to the far outer end in the axial direction of the space where the slope angle α of the tapering space section becomes minus for the first time. The space at the outer end of the tapering space section needs to be 0.8 mm or less; when the space has a dimension is over 0.8 mm and the slope angle α of the tapering space section at the point where the space dimension is 0.8 mm is 45° or more, the widest space which satisfies the condition of 0.8 mm or less and 45° or less is defined as the tapering space section outer end 50b.

In this example, the capacity of the tapering space section 50 (the capacity created with the tapering space section inner end 50a, the tapering space section outer end 50b, and the rotation shaft 31) is set as 5% or more of the entire capacity of the bag section 40 inside the border of the inner end of the tapering space section 50 and 100% or more of the capacity of a pair of radial bearings 24 (the capacity created between the radial beating 24 and the rotation shaft 31); and the space dimension at the outer end 50b of the tapering space section 50 is set to be twice or more of that at the inner end 50a of the tapering space section 50.

The function of the bearing seal system in this invention comprising the structures described above will now be explained, referring to FIG. 2. Because the bearing seal system adopts a bag structure as a basic structure comprising the bag section 40 at which the cylindrical part is covered with the thrust backing plate 25, the bottom section (on the side of the thrust bearing) in FIG. 2 can be regarded as a wall where 1 atm pressure is generated and retained; therefore, the oil 15 does not move even when an external force is added from the top to the thrust bearing side. Therefore, there is no need to take into account oil movement by external force, thus allowing the oil retention space of the tapering space section 50 to be smaller. Since oil movement by external force does not occur, air migration through oil movement does not occur; and as a result, the bearing seal system retains the oil with an amount of pressure as large as 1 atm so as to provide a high external force resistance retention.

The bearing seal system prevents air migration into the oil 15 and provides the stability and the leak tightness because the space from the bag section 40 to the tapering space section 50 is filled with the oil 15; the space between the tapering space section 50 and the rotation shaft 31 is set to be 0.8 mm or less; the slope angle α of the tapering space section at the tapering space section outer end 50b is set to be 45° or less; the space dimension at the tapering space section outer end 50b is set to be twice or more of that at the inner end 50a. Due to the large space ratio between the tapering space section inner end 50a and the outer end 50b with the slope angle α of the tapering space section, even if the air migrates into the oil surface 15a of the tapering space section 50, the air does not reach the beating, also due to the pressure difference associated with the space ratio, the air naturally moves out, eliminating the problem associated with "air migration."

As described, because the capacity of the tapering space section 50 is set larger than that of the bag section 40 or the radial bearings 24, the oil 15 is always retained in the bearing and prevented from leaking regardless of:

the variation in the quantity of injected oil or the manufacturing variation in the internal capacity of the bag section 40;

oil coming out of the thrust bearing surface during the rotation of the rotation shaft 31 or the change in the capacity of the bag section 40 due to heat generation during the rotation, or the change in quantity of the oil 15 due to evaporation or air migration. A groove 27 can be formed to store the oil inside the tapering space section 50 in order to resolve the variation of the quantity of the injected oil and the manufacturing variation in the internal capacity of the bag section 40.

In this example, when the capacity of the tapering space section 50 is A, the quantity of oil to be injected inside the bag section 40 constituting the bearing space is set to stay within the level between 0.1 A and 0.9 A measured from the tapering space section inner end 50a in a stable stationary state.

Basically, when the oil surface 15a is inside the tapering space section 50, the oil remains stable; however, even if the quantity of oil (the level of the oil surface 15a) varies with lapse of time or by change in environment, the oil shortage or leakage can be complemented by filling the oil to reach the point (between 0.1 A and 0.9 A) inside the tapering space section 50 so as to maintain the excellent performance under the normal environment.

Figure 3:
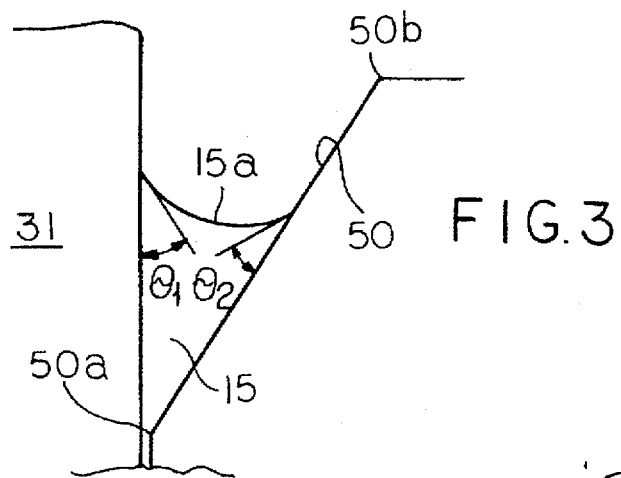
FIG. 3 illustrates an illustration of the major section of the first example.

As illustrated in FIG. 3, it is recommended that the contact angle $\theta_1$ of the oil 15 at both surfaces of the rotation shaft 31 and the tapering space section 50 are set to be 15° or more. When the oil surface 15a is positioned inside the tapering space section 50, the oil 15 contacts the rotation shaft 31 and the tapering space section 50 with certain contact angle $\theta_1$, and the contact angle $\theta_1$ is set to be 15° or more.

As a result of various experiments, the inventors found that the wet dilation (climbing-up phenomenon of liquid) needs to be prevented in order to prevent the oil 15 from leaking and to obstruct the path, which will be explained next.

In order to prevent the wet dilation caused by any small changes in environment and conditions, the condition of ($\gamma S < L + SL$) always needs to be satisfied.

Regarding the contact angle of the solid surface and the liquid, the condition where the solid surface and the liquid are maintained in equilibrium is:

$$\gamma S - \gamma SL = \gamma L \cos \theta 0 \qquad \text{(Young's equation)}$$

wherein

γSL: the tension of the solid-liquid interface,

γS: the surface tension of the solid,

γL: the surface tension of the liquid, and

θ1: the contact angle of the solid and the liquid

The equilibrium is determined by the balance of the three surface tensions.

The value of ($\gamma S-\gamma SL$) is the key in that the energy 1) decreases ($\gamma S>\gamma SL$),
2) increases ($\gamma S<\gamma SL$), or
3) remains the same ($\gamma S=\gamma SL$) by replacing the solid surface with the solid-liquid interface.

When the energy decreases (1), the surface is wet, that is, stable at the the solid-liquid interface; when the energy increases (2) or remains the same (3), the surface is not wet, that is, stable at the solid surface.

The difference between $\gamma S$ and $\gamma SL$ is ($\gamma L \cos \theta 1$) where the contact angle $\theta 1$ of the solid and the liquid balances the equation. That is, the bigger the value of ($\gamma S-\gamma SL$) is, the smaller $\theta 1$ is; at ($\gamma S>L+\gamma SL$), the balance is destroyed, even if the condition of the contact angle of the solid and the liquid, $\theta 1=0°$, and the liquid is spread all over the solid surface. This is the same phenomenon that the oil as liquid climbs up the shaft surface as solid, the same as oil dropped on water spreads over the water.

To solve the problem that oil climbs up the shaft surface depends on whether the condition is ($\gamma S>\gamma L+\gamma SL$) or not. This equation shows that the energy decreases and the surface becomes more stable when the interface ($\gamma SL$) of the solid and the liquid and the liquid surface ($\gamma L$) are newly created on the solid surface (for example, of a shaft) than when there is only the solid surface ($\gamma S$). In this case, so-called solid surface is eliminated and the the solid-liquid interface and the liquid surface are newly created; the climbing-up wet dilation can not be stopped.

Even if the external forces (e.g. gravity, vibration, impact, centrifugal force, magnetic force, or other pressures) are added to the condition of above issue, these external forces work in the direction which changes the curvature of the liquid surface in a form of consequent pressure and does not change the equilibrium point. These forces try to move the position of the equilibrium point with the surface tension of the liquid, but have no effects under the climbing-up phenomenon.

As long as the condition of ($\gamma S>\gamma L+\gamma SL$) is maintained, the climbing-up (wet dilation) phenomenon of liquid can not be prevented: the condition needs to be changed to ($\gamma S<\gamma L+\gamma SL$) in order to prevent the climbing-up phenomenon. Specifically, the surface tension of the solid surface needs to be decreased. Under the condition ($\gamma S>\gamma L+\gamma SL$), the external forces have effect via the surface tension of the liquid. Generally, a metal surface obtains a very large surface tension. Usually a formed layer of pellicle decreases the surface tension; however, since the tension is still large, the condition ($\gamma S>\gamma L+\gamma SL$) occurs and causes the climbing-up phenomenon of liquid.

The ways to prevent the climbing-up phenomenon are:

1) setting the condition to be ($\gamma S<\gamma L+\gamma SL$),
2) enlarging he actual contact angle of the solid surface and the liquid, and
3) using external forces efficiently.

To implement 1), 2), and 3):

1) maintain the condition of ($\gamma S<\gamma L+\gamma SL$) by protecting the surface with low surface tension material such as oil repellant agent or the like so as not to expose the metal surface directly,
2) minimize surface roughness and enlarge the actual contact angle of the solid surface and the liquid; the solid surface needs to be free of gaps, grooves, scratches, and irregularities; the wider the surface area is, the smaller the actual contact angle is, and
3) have external forces work in the direction to pull back the climbing-up phenomenon.

The larger the contact angle $\theta 1$ of the solid and the liquid is, the less the oil tends to leak (the stronger the retention). In order to reach this condition, the contact angles $\theta 1$ of the oil 15 with both surfaces of the rotation shaft 31 of the tapering space section 50 and the tapering space section itself needs to be set as 15° or more. Specifically, these conditions are satisfied by placing a relatively low surface tension material such as plastic on the surface in contact with the liquid. If the inner wall surface of the tapering space section 50 is constituted with a low surface tension plastic material which is reasonably immune to wet dilation and the oil surface movement by capillary action, chemically stable, and highly processable, a practical product will be provided. The plastic material can be put on the inner wall surface of the tapering space section 50 by the way of coating or painting.

Furthermore, it is recommended that the difference between two contact angles $\theta 1$ of the oil 15 with both the surface of the rotation shaft 31 of the tapering space section 50 and the tapering space section 50 itself is set to be 15° or less because the smaller the angle difference between the two angles $\theta 1$ is, the less the oil tends to leak.

In this example, the surface roughness Ra of the inner wall of the tapering space section 50 is set to be 0.25 μm or less to minimize the surface roughness of the solid. If the inner wall surface of the tapering space section 50 is rough, the roughness causes the same condition as capillary action. The capillary action occurs when the ratio of the solid surface which the oil surface contacts is large as compared to the oil volume; the same phenomenon occurs when the irregular roughness or grooves exist on the surface. When the contact angle $\theta 1$ of the solid and the liquid is less than 90° ($\theta 1<90°$), the actual contact angle becomes smaller and the oil becomes susceptible for leakage if irregular roughness or grooves exist on the surface. It is possible to increase the actual contact angle of the solid and the liquid to prevent the oil from leaking by reducing the surface roughness Ra of the inner wall of the tapering space section 50. The configuration that the surface roughness Ra is set to be 0.25 μm or less can be applied to the side of the rotation shaft 31 if needed.

Actually, the contact angle of the oil varies depending on the solid surface condition; and once being wet, the surface becomes easier to be wet again than the surface which has not been wet and the contact angle of the oil becomes smaller. For example, when a water drop moves on the slant and dirty surface of a glass, the contact angle of the water drop on the front side of the glass is large; the contact angle becomes smaller after the water drop moves. The surface once wet is easier to be wet again and the water drops through the same path on the surface due to the difference in the microscopical shape of the solid surface or the difference of surface tensions. That is, if the surface is irregularly rough even when the contact angle is same, the curvature is radically changed with the slope of the solid surface and it is found that the contact angle maintains the balance in the different condition macroscopically. When the non-uniform surface tensions exist, the oil in concave space or surrounded by dirts remains on the surface even after the entire oil withdraws; when the oil climbs up again, the contact angle is unable to grow macroscopically and communicates with the oil left before. As a result, the contact angle becomes smaller and the oil tends to move the same path on the surface as before.

With such a solid surface, when the surface is once wet for any reason or contacted with the oil during injection, its contact angle and retention are smaller and easily move the oil. The irregular surface roughness and dirt (the non-uniform surface tensions) at the bearing outlet, that is, the outer side of the tapering space section, needs to be reduced as much as possible.

It is said that the macroscopic (apparent) contact angle of the solid and the liquid when the solid surface has an irregular roughness and the difference of the surface tensions becomes as follows:

With an irregular surface roughness, when the surface area ratio of the actual surface to the smooth (flat) surface is r, the macroscopic (apparent) contact angle θW (Wenzel contact angle) is cos θW=r cos θ1 (θ1: Micro (actual) contact angle).

If r is 2 or more for the irregular surface roughness, the macro contact angle becomes cos θw=0°, even when the micro contact angle is θ1=60° (cos θ=0.5), which is considered as large and the climbing-up phenomenon of liquid (wet dilation) cannot be stopped. It is recommended that the surface roughness of the surface from the tapering space section to the outer side is reduced and is polished like a mirror in order to prevent an oil leakage.

On the other hand, the surface with the difference of the surface tensions can be regarded as a composite surface of different surface tensions; therefore, the macro (apparent) contact angle θC (Cassy contact angle) is:

cos θC=A1 cos θ1+A2 cos θ2.

A1 and A2: the ratio of the surfaces occupied by the different surface tensions and θ1 and θ2: the micro (actual) contact angle of different surface tensions.

It is also recommended to reduce the roughness of the surface from the tapering space section to the outer side and polish it like a mirror in order to prevent an oil leakage.

When any point within ½ length from the outer end 50b in the axial direction of the tapering space section 50 is the home position, it is effective to form a tapering space section 50, using the material or the surface processing, with the contact angle θ1 at least 15° larger at the inner wall surface covering the home position to the outer side than that covering the interior side of the home position. To enlarge the contact angle of the solid and the liquid is one of the methods to prevent the oil leakage. When the contact angle cannot be enlarged for any reason, it is effective to enlarge only the most important contact angle for retention.

Furthermore, it is effective that the contact angle at the outer end 50b, that is, at the larger radius side of the tapering space section 50, is set larger than that at the inner end 50a, that is, at the smaller radius side. Because the oil inside the bearing is affected by the centrifugal force while the rotating member rotates, the oil pressure of the surface on the larger radius side in a radius direction of the tapering space section is larger than that on the smaller radius side. When the contact angles of the surfaces on both the inner and the outer ends are same, the contact point of the solid and the oil surface on the larger radius side is positioned outside of the contact point of the solid and the oil surface on the smaller radius side and the surface becomes susceptible for oil leakage and air migration. When the contact angle on the larger radius side is enlarged, the contact point of the solid and the oil surface on the larger radius side becomes closer to the contact point of that on the smaller path side, and the surface excels in oil leakage and air migration.

In the example of this invention, the outer end (the upper end in FIG. 2) of the hydrodynamic pressure generating groove of the radial bearing 24 can be extended to the oil reservoir groove 27 when created as shown in FIG. 2 or the inner end 50a of the tapering space section 50 when the oil reservoir groove was not created. If the hydrodynamic pressure generating groove is extended to the inner end 50a of the tapering space section 50, the slope angle α of the radial bearing 24 is always maintained as α>0°, resulting in prevention of air coming in during oil injection and the oil being retained with force in the direction to push out migrated air if any to always maintain conditions which retain oil easily.

The tapering space section 50 is formed to create an opening with the angle of 45° or less viewing from the inner axial direction side to the opening side; the slope angle of the outer tapering space section 50 is at 45° or less. With this structure, the condition between the solid surface of the tapering space section 50 and the oil 15 is secured and the oil leak cage is prevented even if the surface of the oil 15 rises over the expected point at the tapering space section 50.

When the slope angle α of the tapering space section 50 is fixed and formed on the inner wall surface being perfectly flat in cross section, it is the easiest shape to be processed and the oil becomes stable with force to absorb the oil inside and push out the air because the slope angle a of the tapering space section is more than 0° at any point.

It is recommended that the average slope angle of the tapering space section 50 is set to be 10° or more. An average slope angle of more than 10° is needed to prevent the oil transfer caused by external force or the space change by a relative move.

It is possible that more than two thirds of the space of the tapering space section 50 in the axial direction is set parallel at a distance of 0.4 mm or less (the slope angle α=0°). With this shape, wider space for the tapering space section 50 is available and the difference and variation of the oil capacity 15 can be resolved, the distance between the parallel tapering space can be reduced; and a leak tight condition is secured.

Figure 4:
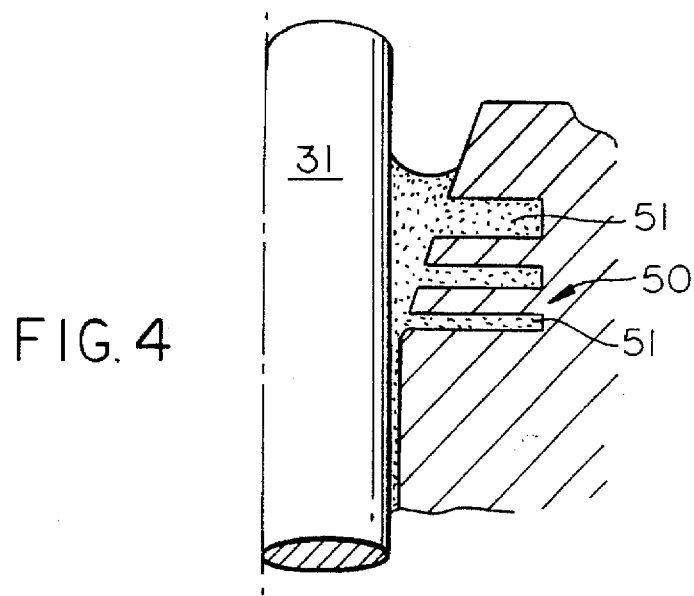
FIG. 4 illustrates a half cross section of an enlarged modified major section of the first example.

The example in FIG. 4 illustrates that a space 51 is created in the radial direction inside the tapering space section 50. By creating the space 51 in the radial direction, the capacity for the oil retention can be increased; by maintaining the smaller width of the space 51 in the axial direction than that between the outer end 50b of the tapering space section 50 and the rotation shaft 31, the oil in the space 51 is firmly retained. Because the space 51 formed in the radial direction does not take much space in the axial direction, the total width in the axial direction can be reduced and the impact resistance retention becomes effective.

Figure 5:
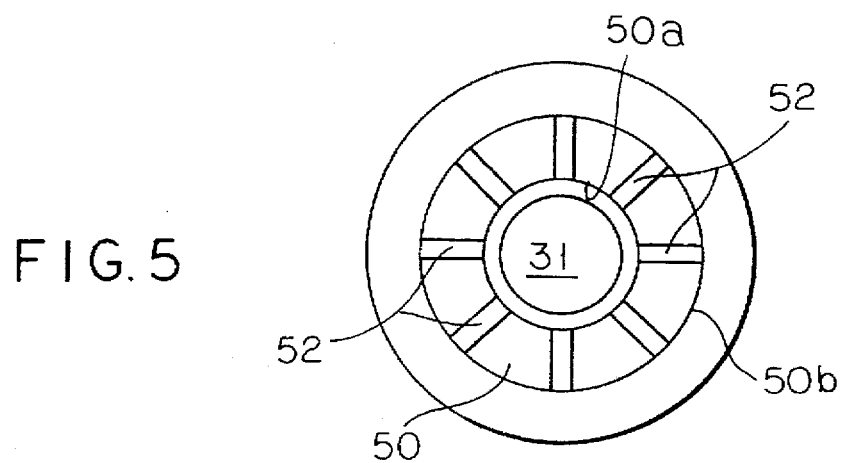
FIG. 5 illustrates an enlarged top view of a modified major section of the first example.
Figure 6:
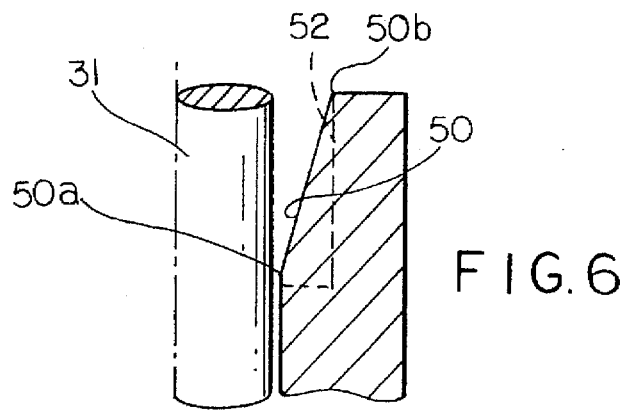
FIG. 6 illustrates a cross section of the bearing seal system illustrated in FIG. 5.

If the condition of the tapering space section 50 described before is satisfied, the space 51 can be created in the axial direction like the groove-like space created in the radial direction or as a hole, as illustrated in FIGS. 5 and 6.

Figure 7:
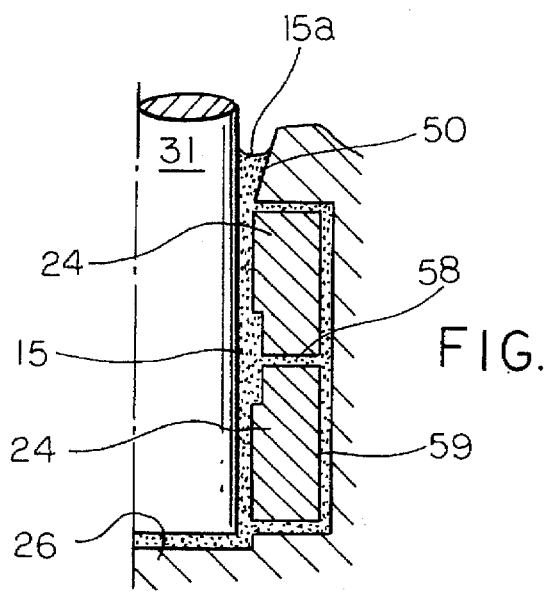
FIG. 7 illustrates a half cross section of a modified bearing seal system of the first example.

As illustrated in FIG. 7, a circulation hole 53 can be formed to connect two radial bearings 24 via the outer side of each radial bearing 24. Because the hydrodynamic pressure generated in the radial hydrodynamic bearing is large, a pressure is generated to cause an oil leak when the hydrodynamic pressure is unbalanced. However, the pressure difference caused by the hydrodynamic pressure can be resolved and the oil leakage is prevented by connecting two radial bearings 24 via the outer side of each radial bearing 24 with the circulation hole 53. The retention pressure by the bag structure is utilized effectively at the tapering space section 50.

A groove extending in the shaft direction can be formed from the tapering space section 50 to the outside. This structure creates the condition where the exchange of the oil 15 and the air is smooth when the air migrates into the oil 15 for any reason and the air is pushed out with much more certainty. The groove pushes the oil to the narrower space and the air to the wider space, and separates the air and oil. If the groove is extended in the outer axial direction, the separated oil or air is able to move along the groove for smooth exchange.

The ratio of air to oil in the bearing space should preferably be 2% or less. When oil contains air, the volume of air is inversely proportional to pressure and proportional to the absolute temperature because it is a gas. Therefore, if the ratio of air in relation to oil is not maintained at less than a certain level, oil may leak or be short due to a change in pressure or temperature. When the ratio can be kept at 2% or less using the vacuum-injection method or the like, the oil capacity containing migrated air increases by 2% or less at 0.5 atmospheric pressure, and by 0.4% or less when the temperature is raised by 60° C.; those changes do not cause leakage due to the capacity ratio of the bag section and the tapering space section 50.

Figure 8:
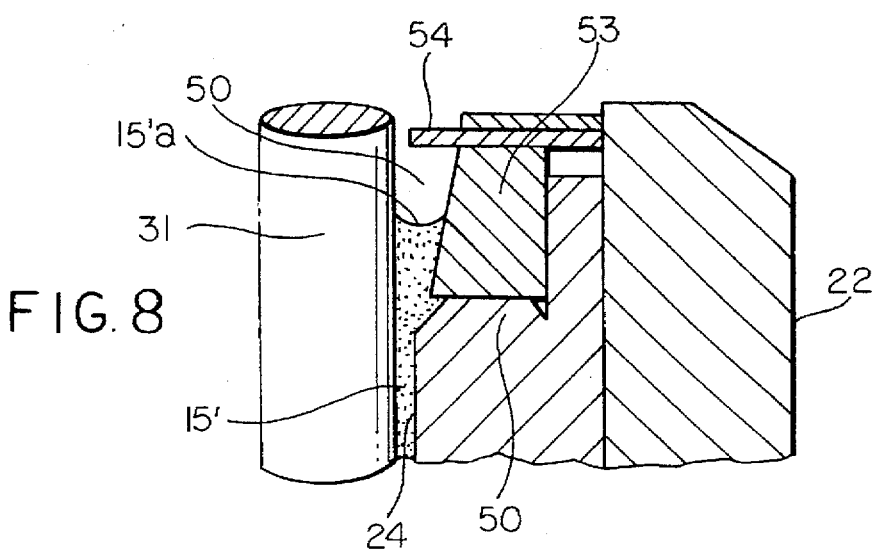
FIG. 8 illustrates an enlarged half cross section of a modified major section of the beating seal system.

In the example illustrated in FIG. 8, a magnetic fluid 15' is used as oil and a (magnetized) magnet 53 is located in the radius direction in the tapering space section 50 to form a magnetic circuitry between the tapering space section and the rotation shaft 31. A seal plate 54 is located outside the magnet 53. The magnetic circuitry is strong because the space between inside the tapering space section 50 and the rotation shaft 31 is narrow and is weak at the outer end because the space between the outer end of the tapering space section 50 and the rotation shaft 31 is wide, and, at the same time, a magnetic shield of predetermined magnetic flux density gradient is generated in almost the same direction within more than a half area of the tapering space section 50.

By establishing these magnetic conditions and constructing the tapering space section 50 as described above, the magnetic fluid 15' obtains the inward force not only from the tapering space section 50 but also from the magnetic force, resulting in creation of the more leak tight status. By maintaining the magnetic flux density gradient constant, a predetermined level or more of magnetic force is added even though the surface position 15'a of the magnetic fluid 15' changes to some extent.

Figure 9:
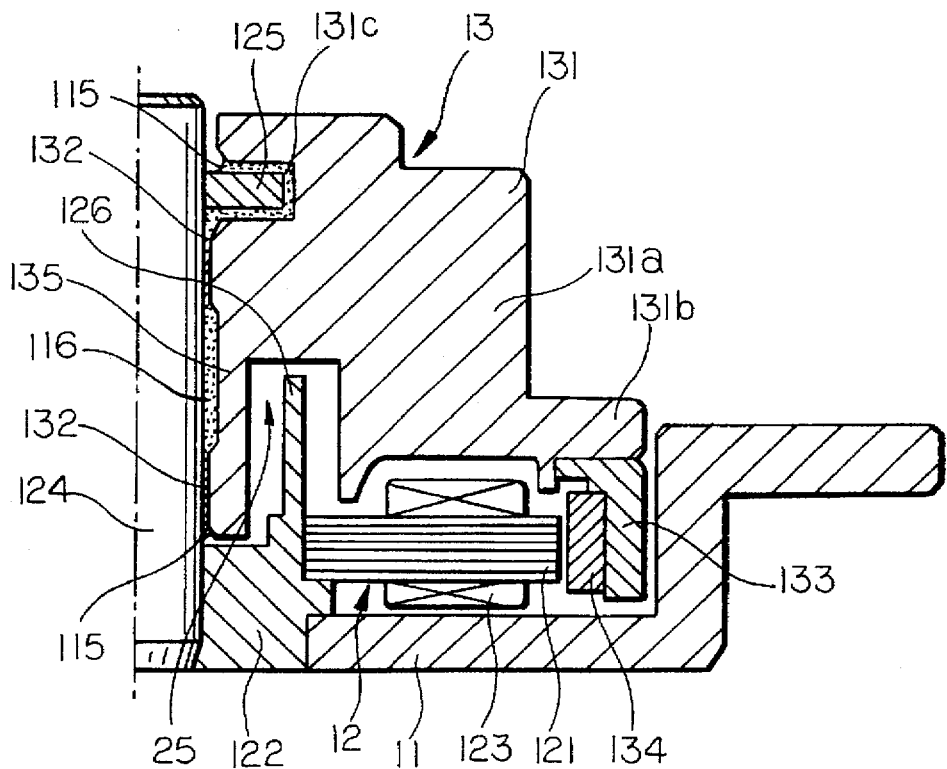
FIG. 9 illustrates a half cross section of a HDD motor structure of the second example of this invention.

The second example in which the bearing structure is configured differently from the first example is illustrated in FIG. 9.

In the center of a core holder 122 supporting a stator assembly 12, a fixed shaft 124 which acts as the core during motor rotation, is perpendicularly installed toward upward in the figure; a hub 131 constituting a rotor assembly 13 is rotatably supported against the outer peripheral of the fixed shaft 124 via a pair of radial lubrication bearing sections 132. The hub 131 comprises a cylindrical body 131a for a magnetic disk installation and a mount 131b located at the bottom edge of the body end of 131a as illustrated, and a motor driving magnet 134, which is a motor rotor magnet, is installed on the mount 131b via a back yoke 133.

The middle section 135 of the radial lubrication bearing sections 132 can be constituted as a single component or a cylindrical spacer can be inserted within it; both radial lubrication beating sections 132 are formed at a predetermined distance in the shaft direction. Each inner peripheral surface of radial lubrication bearing 132 and outer peripheral surface of the fixed shaft 124 mutually constitute lubrication surfaces, and a predetermined amount of bearing oil is filled in a cylindrical beating section 116 including both the lubrication surfaces.

In the upper end section of the fixed shaft 124 illustrated, a thrust plate 125 which constitutes a thrust beating is installed and a circular recess section 131c is formed on the hub 131 side to hold the thrust plate 125. The circular recessed section 131c is continually filled with the bearing oil from the bearing section 116; the thrust plate 125 can rotatably support the rotating body including the hub 131 in the circular recessed section 131c.

A circular projection 126 formed on the core holder 122 is extended in the axial direction (upward in the illustration) by a predetermined length and the ]-shaped (cross section) narrow path 25 is formed by each outer peripheral wall surface of the radial lubrication bearing 132 and the middle section 135 and the inner peripheral wall surface of the hub 131, providing a leak-tight structure.

Figure 10:
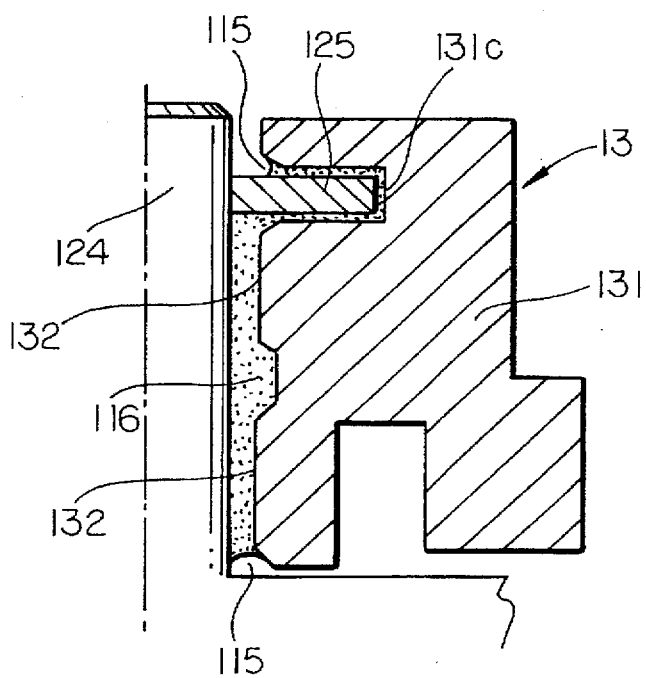
FIG. 10 illustrates a half cross section of a beating seal system of the second example.

In this example, as illustrated in FIG. 10, the tapering space sections 115, described in FIG. 2 are located in two places at both sides of the cylindrical bearing 116. The beating oil is continually filled from inside the bearing 116 through the two tapering space sections 115, so that the surface position of the outer end of oil stays inside the tapering space section 115. See previous examples for details so that the conditions in each tapering space section 115 remains the same as described above.

In the example illustrated in FIG. 10, the capacity of the tapering space sections 115 is set to be 10% or more of that between the inner ends of both tapering space sections and 100% or more of the radial bearing sections. The ratio of the dimension of the outer end of the tapering space section 115 to that of inner end of the tapering space section 115 is set to be more than 2.

In this example also, both tapering space sections 115 were continually filled with oil and are configured as described above, so the structure does not easily allow air to migrate into oil and provides a stable leak-tight status. Against variation in the volume of injected oil or internal capacity, the capacity change due to a thrust bearing's coming out during rotation or the like, heat generation, evaporation or air migration, oil is always retained in the bearing section and is prevented from leaking.

Regarding the direction of the opening of the tapering space section 115, the tapering space section 115 at upper side is opened toward the shaft: rotation generates a centrifugal force to the oil which is always larger at the larger radius side; therefore, this configuration prevents the pressure by centrifugal force to work in the direction that allows oil to leak, providing a stable status. The tapering space section 115 at bottom side in FIG. 10 is opened to the direction parallel to the rotation shaft.

The thrust bearing system in this invention is configured to obtain the hydrodynamic pressure in the direction that cancels centrifugal force. Both centrifugal force and hydrodynamic pressure are generated when rotation begins and can balance in the configuration.

Figure 11:
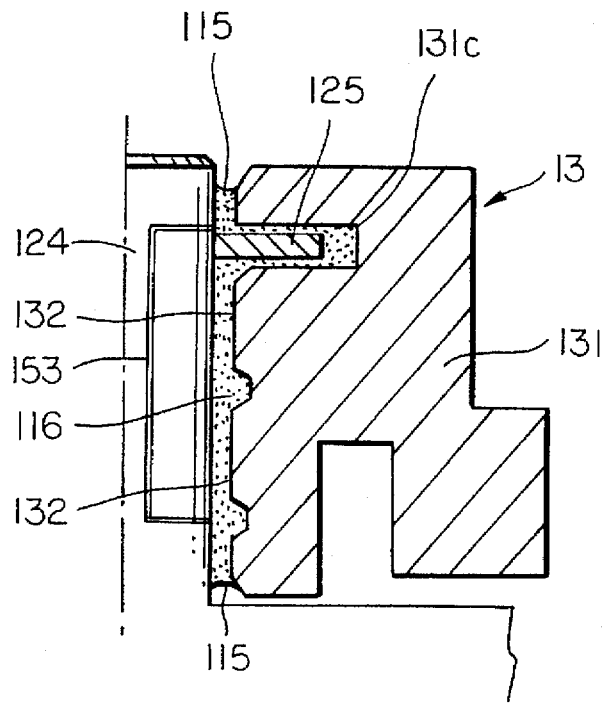
FIG. 11 illustrates a half cross section of a modified example of the second example.
Figure 12:
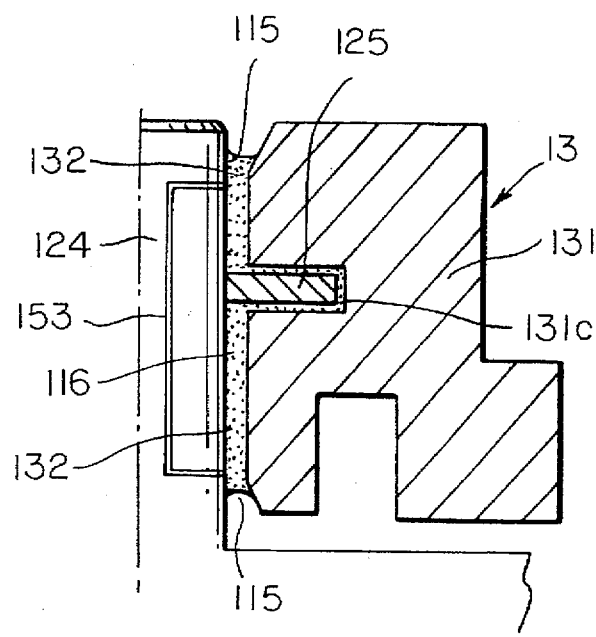
FIG. 12 illustrates a half cross section of another modification of the second example.

In the example illustrated in FIG. 11 or 12, an oil circulation hole 153 which connects both ends of the bearing 116 is created inside the fixed shaft 124. The oil circulation hole 153 communicates the inner end side of the upper tapering space section 115, the outer end of the thrust bearing section which is comprised of a thrust plate 125 and the circular recess section 131c, the inner end side of the bottom tapering space section and outside the radial bearing section 132. In this way, pressure generation is cancelled via a circulation hole 153 when the hydrodynamic force is unbalanced inside the bearing.

Figure 13:
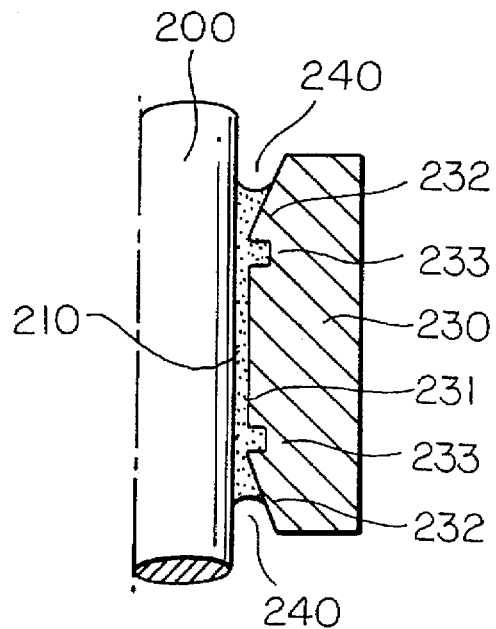
FIG. 13 illustrates a half cross section of a beating seal system of the third example of this invention.

The third example of this invention is described referring to FIG. 13. In the example illustrated in FIG. 13, oil 210 is filled in the space between the external surface of a fixed shaft 200 and the inner peripheral surface of a radial bearing 230, and the external surfaces at both ends in the axial direction of oil 210 are exposed to air.

The space between the outer peripheral surface of the fixed shaft 200 and the inner peripheral surface of radial bearing 230 is comprised of a radial bearing section 231, the tapering space sections 232, and two external surfaces 240 which are formed in outer shaft direction of a tapering space section 232.

As described above, both ends of the bearing sections 231 have two tapering space sections 232, oil 210 is continually filled from inside the bearing section 231 to both tapering space sections 232 and oil surface 210 is positioned within a tapering space section 232. The tapering space section 232 is constituted under the same conditions as described in previous examples.

Also in this example, the capacity of both tapering space sections 232 is set to be 200% or more of that of the bearing section 231 which exists between both inner ends of the tapering space sections. The distance between the outer end of the tapering space section 232 and the shaft is set to be twice or more of that between inner end of the tapering space section and the shaft.

Figure 14:
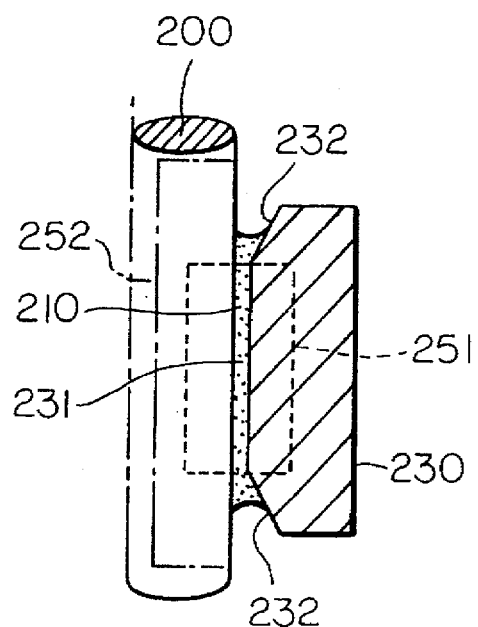
FIG. 14 illustrates a half cross section of the modification of the third example.

As illustrated in dashes in FIG. 14, when an oil circulation hole 251 is created to connect both inside of the inner end of the tapering space sections 232 or, as usual, the radial bearings 230 are installed in two places, an exhaust means consisting of a hole 252 to push out the internal air between the radial bearings 230 can be created in the fixed shaft 200 or a space can be created in the radial bearings 230 to connect the radial bearings 230. When air exists in the space between the bearings, air can be expanded or pressurized due to a change in atmospheric pressure or temperature. In this case, the air pressure can push out the intermediary oil in the bearing section. When an air exhaust means consisting of a hole or space communicates with the bearings, the expanded air escapes via the exhaust means, thus canceling the pressure difference, and, as a result, the pressure that push out oil is equalized.

Figure 15:
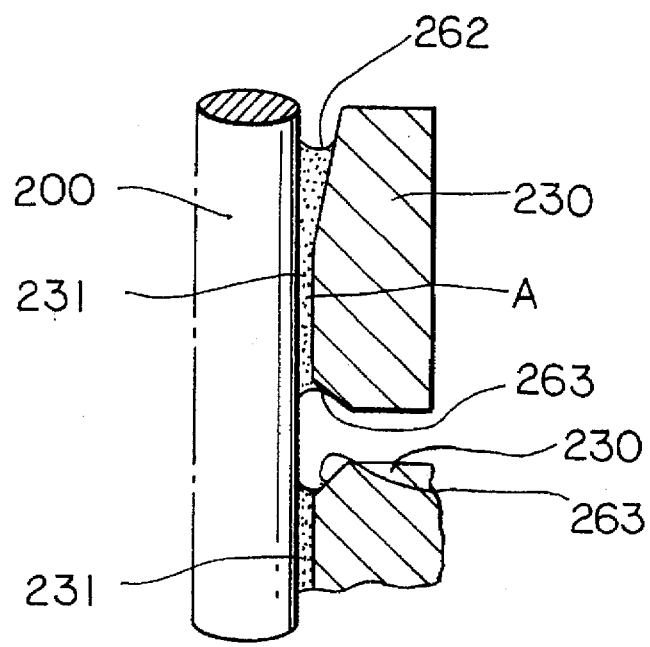
FIG. 15 illustrates a half cross section of another modification of the third example.

In the example illustrated in FIG. 15, two radial bearings 230 are positioned on both upper and lower side, the slope angle of the outer tapering space section 262 at the inner side is set to be larger than that at the outer side, and at the same time, the oil contact angle remains 45° or less. The smaller the contact angle that generates the maximum retention pressure, the larger the generated pressure is: about 70% of the (maximum retention) pressure is generated at a 45° contact angle and the contact angle should be kept at this level.

Also in the example illustrated in FIG. 15, the average slope angle of the tapering space section 262 and 263 is constructed to be 10° or more. A slope angle of 10° or more on average is required in order to prevent oil from moving when the system is exposed to a change in tapering space due to external forces or relative movement.

As in the example illustrated in FIG. 15, when air exists in the space between the two bearings 230, it is recommended that the average slope angle of the tapering space section 263 positioned at the inner side of the bearing section 231 is set to be twice or more of that at the outer side of the bearing section 231. In this way, the capacity of the tapering space section 262 at the outer side remains larger than that at the inner side, increasing projected actual oil retention capacity. Oil leaks easily out of the inner tapering space section 263 at the inner side; however, this cannot be a problem because the system returns the oil inside the bearing.

Figure 16:
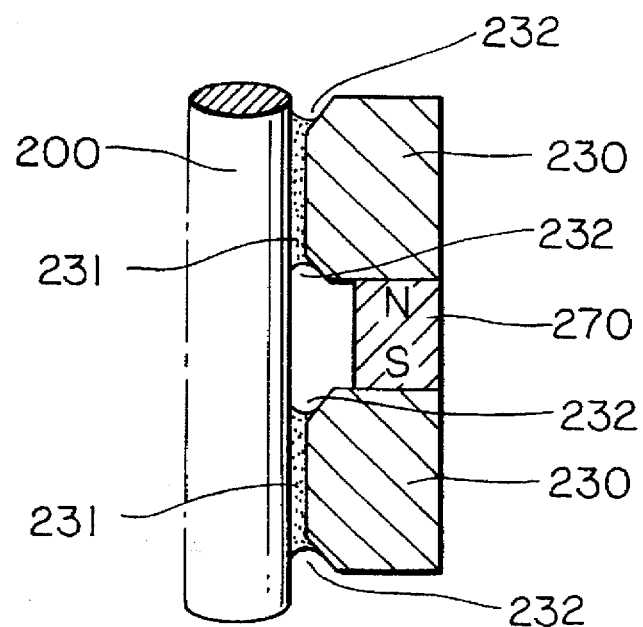
FIG. 16 illustrates a half cross section of one more modification of the third example.

In the example illustrated in FIG. 16, a magnetic fluid is used as oil and a magnet 270 is positioned between two bearings 230 made of magnetic material to form a magnetic circuitry with the fixed shaft 200 also made of the magnetic material. The magnetic circuitry, provided that a bearing 230 and a fixed shaft 200 are comprised of magnetic materials, is strong at the inner end of the tapering space section 232 and weak at the outer end of the tapering space section 232; the system is designed to form a predetermined magnetic flux density gradient in one direction in at least half the area or more of the tapering space section 232.

This magnetic condition makes it difficult for a magnetic fluid acting as oil to leak due to the magnetic force working inward. By maintaining a magnetic flux density gradient constant, a predetermined level or more of the magnetic force is added even if the position of magnetic fluid is changed slightly.

Figure 17:
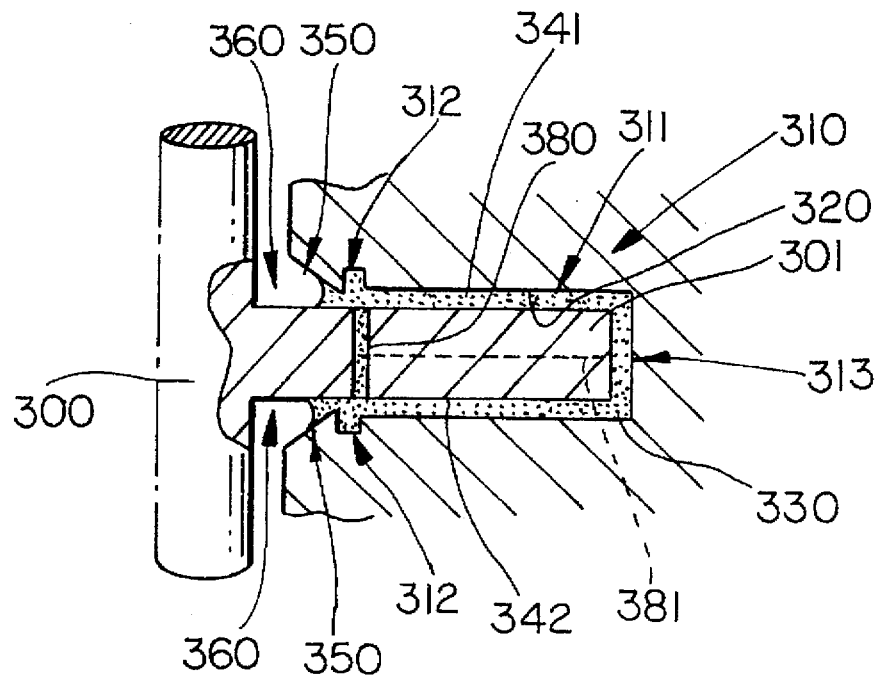
FIG. 17 illustrates a half cross section of a bearing seal system of the fourth example of this invention.

The fourth example is described in FIG. 17. The example in FIG. 17 illustrates the structural advantage of bag structure using a quasi-bag structure for the condition of two tapering space sections. In this example, spaces used as oil reservoirs communicate with a central hole to equal pressures, and at the same time, the two tapering space sections are positioned in almost the same position in the radius direction to apply almost the same external pressure, obtaining the same effect as the bag structure. The bag section provides the advantage to fully support the pressure from centrifugal force.

In FIG. 17, a hub is installed rotatably on a fixed shaft 300 via a radial bearing, which is not illustrated, and a thrust bearing 310. A thrust bearing 310 is comprised of a thrust disk 301, which is united with the fixed shaft 300 and is inserted into a cylindrical groove 320 extended in the radial direction and grooved on the hub side, and oil 330 is continually filled in the space between the cylindrical groove 320 and the thrust disk 301. In a thrust bearing 310, at least one of the four facing surfaces, created by a cylindrical groove section 320 and the thrust disk 301, has a normally grooved hydrodynamic pressure generating groove.

In the thrust bearing 310, on the smaller radius side of two spaces 341 and 342 formed by four facing surfaces in the shaft direction, created by the groove 320 and the thrust disk 301, two tapering space sections 350 which open to outer passage along the fixed shaft 300 are created: each of the tapering spaces 341 and 342 of the thrust bearing are comprised of the thrust bearing section 311, the tapering space section 350 at the smaller radius side of the bearing section 311, oil reservoir formed between the bearing sections 311 and the tapering space section 350, the outer space 360 formed on the smaller radius side of the tapering space section 350, and the inner space of space 313 formed on the larger radius side of the tapering space section 350 which communicates with the two tapering spaces 341 and 342.

Oil 330 is continuously filled from one tapering space section 350 to the other tapering space section 350, and at the same time the oil reservoirs 312 are communicated with each other in the shaft direction via a center hole 380. The tapering space section 350 is formed to fulfill the conditions described in other examples.

In this example, the total clearance in the shaft direction at the bearing sections 311 is set to be 200 μm or less and the total capacity of the tapering space sections 350 is set to be 100% or more of that of the thrust bearing 310; the total capacity of the tapering space sections 350 is set to be 30% or more of that of the bearing section 311, the oil reservoir 312, the outer space 313, and the center hole 380 and the dimension between the outer end of the tapering space section and shaft is set to be triple or more of that between the inner end of the tapering space section and the shaft.

Due to the total clearance in the shaft direction at the bearing section being is set to be 200 µm or less, the movement in the thrust direction is suppressed and the change in the tapering space which affects oil is suppressed to obtain an excellent oil retention.

As illustrated in dashes in FIG. 17, an oil circulation hole 381 can be T-figured so the outer space 313 and the oil reservoirs 312 can be connected. By connecting both sides of the thrust bearing section 311 with the circulation hole, the difference in pressure is suppressed to prevent oil leakage.

Figure 18:
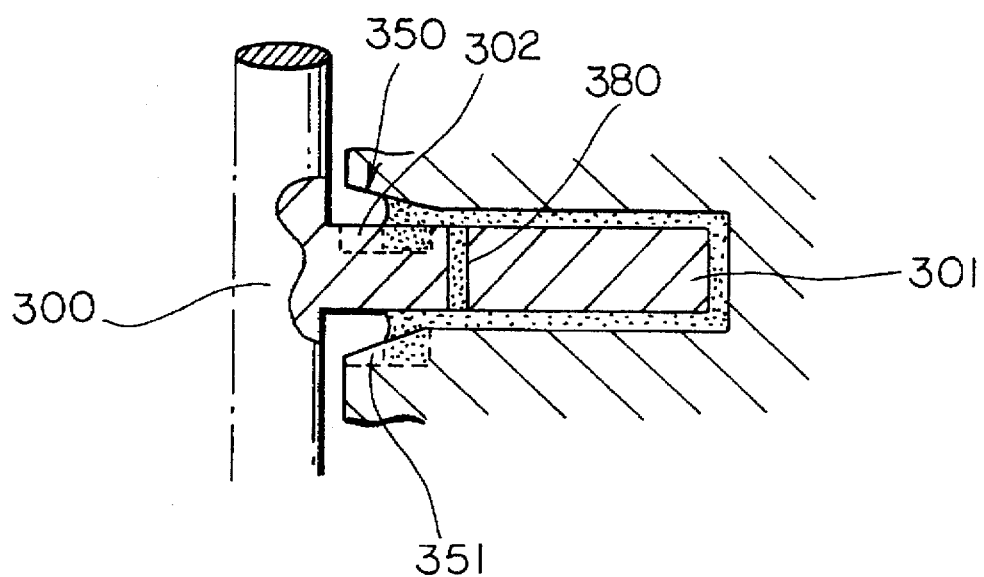
FIG. 18 illustrates a half cross section of a modification of the fourth example.
Figure 19:
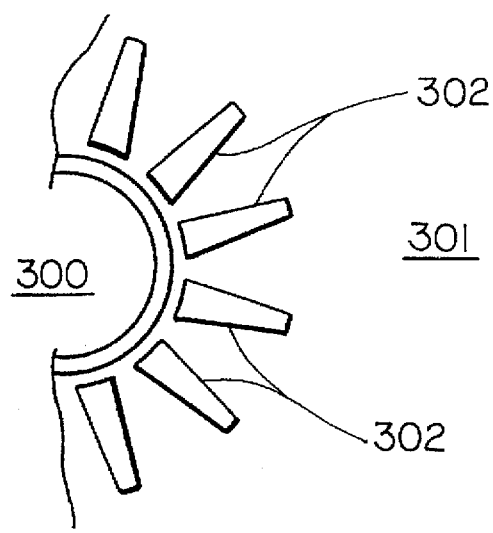
FIG. 19 illustrates a top view of enlarged major section of FIG. 18.
Figure 20:
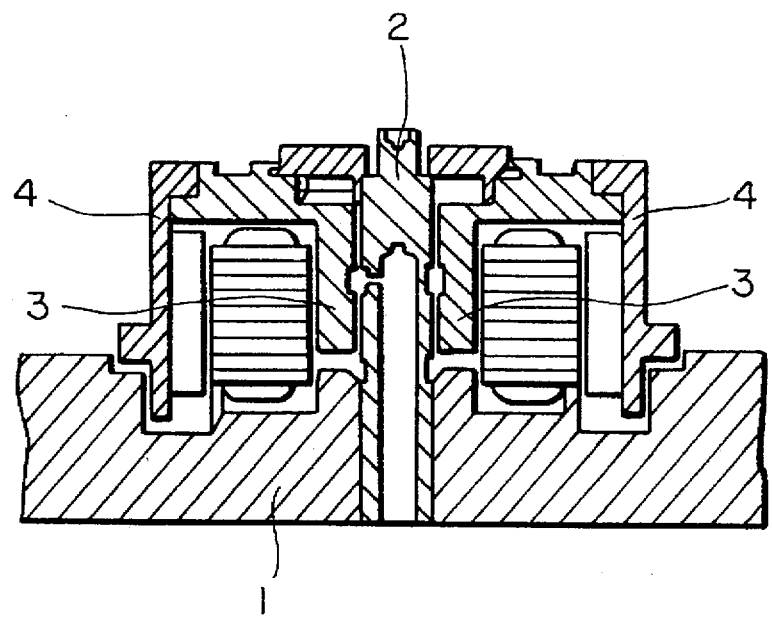
FIG. 20 illustrates a cross section of a conventional bearing system structure.

In the example illustrated in FIGS. 18 and 19, a tapering space 302, which satisfies the condition of the tapering space section, is added in the axial direction to the thrust disk 301 which faces the tapering space section 350 in the upper side of FIG. 18. By creating the tapering space 302 in the axial direction, the capacity to retain oil can be increased; especially by making the space 302 smaller than the outer end width of the tapering space section 350, oil in the tapering space 302 is retained for certain. The tapering space 302 in the axial direction does not take any space in the thrust bearing direction; therefore, the dimension in the thrust bearing direction can be reduced and a better shock resistance retention is retained. The tapering space 302 can be created on only one side of the tapering space sections 350, and as illustrated together in FIG. 18, the tapering space 351 in the axial direction can be formed in the tapering space section 350.

As described above, the bearing seal system of this invention retains oil in the bearing section constantly and sufficiently, and at the same time, retains oil in a stable manner, demonstrating its excellence in the prevention of oil leak cage and external force resistance so as to improve the dependability of the system.

Due to the larger capacity of the tapering space section as compared to that of the bag section, the radial bearing section, and the thrust bearing section, the oil is always retained in the bearing section and prevented from leaking regardless of variations in injected oil or the internal capacity, capacity change caused by the thrust bearing coming out to the surface during rotation or the heat generation, or change in oil capacity due to evaporation or migrated air.

The large space ratio of the inner end and the outer end of the tapering space section does not allow oil to move to the bearing section regardless of the air migration into the oil surface, and the pressure difference caused by the space ratio naturally pushes air out to cancel the migrated status. The space ratio secures oil at any position.

The invention was described in detail based on examples; however, this invention is not limited to the examples and it is apparent for those skilled in art that a variety of modifications can be performed within the objective. For example, this invention used a system with a fixed shaft to describe the examples, but it is also applicable in the same manner to a rotatable system; this invention is not limited to the usage as a motor and is also applicable to a variety of systems which use bearings other than motors.

What is claimed is:

1. A bearing seal system comprising:
    a shaft formed either on a rotating member or a fixed member;
    a cylindrical bag section formed on a non-shaft member, said shaft being inserted into said bag;
    a pair of radial bearing sections formed in said cylindrical bag section, said rotating member and fixed member being relatively rotatably supported by said pair of radial bearing sections;
    a tapering space section being positioned adjacent to at least one of said radial bearing sections formed in an outer shaft direction; and,
    oil which is filled from said bag section to said tapering space section; wherein:
    (1) a minimum space in said tapering space section is formed at an inner end of said tapering space section on said radial bearing section side and a maximum space in said tapering space section is formed at an outer end of said space tapering section which is on an opposite side of said radial bearing,
    (2) a slope angle is defined between said tapering space section and said shaft, where said slope angle of the tapering space section, as viewed from the inner end of said tapering space section to the outer end of said tapering space section, is at least 0° or more;
    (3) a space between the outer end of said tapering space section and said shaft is less than 0.8 mm and said slope angle of the tapering space section is 45 or less; and
    (4) a capacity of said tapering space section is at least 5% of that of said bag section, at least 100% of that of said radial bearing section, and a distance between the outer end of said tapering space section and said shaft is at least twice that between the inner end of said tapering space section and said shaft.

2. The bearing seal system of claim 1 wherein an oil circulation hole is formed by connecting both ends of said radial bearing in said bag section.

3. A bearing seal system comprising:
    a radial bearing section for rotatably supporting a rotating member against a fixed member, said radial bearing section being formed in one of said rotating member and said fixed member;
    oil which is filled between said fixed member and said rotating member; and
    a tapering space section which is formed in the axial direction on at least one of a top side and a bottom side of said radial bearing section, wherein:
    (1) a minimum space in said tapering space section is formed at an inner end of said tapering space section and is on said radial bearing section side and a maximum space of the tapering space section is formed at an outer end of said tapering space section and is on an opposite side from said radial bearing section;
    (2) a slope angle is defined between said tapering space section of the radial bearing section and an opposite wall, where said slope angle as viewed from the inner end of said tapering space section to the outer end of said tapering space section, is at least 0°;
    (3) a distance between the outer end of said tapering space section and said opposite wall is 0.8 mm or less and the slope angle of said tapering space section is 45° or less; and
    (4) a capacity of said tapering space section is at least 100% that of said radial bearing and the distance between the outer end of said tapering space section to said opposite wall is at least twice that from the inner end of said tapering space section to said opposite wall.

4. The bearing seal system of claim 3 wherein an oil circulation hole which communicates the inner end of said tapering space section with said radial bearing is formed.

5. The bearing seal system of claims 1 or 3 wherein a groove is extended from said tapering space section to its outer side in the axial direction.

6. A bearing seal system including:

a bearing comprising a radial bearing and a thrust bearing to rotatably support a rotating member against a fixed member, a tapering space section provided on a top side and a bottom side of said radial bearing, and oil which is filled from said tapering space section provided on said bottom side of said radial bearing to said tapering space section provided on said top side of radial bearing wherein:

(1) a minimum space in each of said tapering space sections is formed at an inner end of the tapering space section and a maximum space in each of said tapering space sections is formed at an outer end of said tapering space section (2) a slope angle is define between each of said tapering space sections of said tapering space section each tapering space section, as viewed from the inner end to the outer end of said tapering space section, is at least 0°, (3) a distance between the outer end of each tapering space section and the opposite wall is 0.8 mm or less and the slope angle of each tapering space section is 45° or less, and (4) a capacities of both capacity of each tapering space section is at least 10% of of a capacity of a space between the two tapering space sections, and at least 100% of a capacity of the radial bearing, and the distance between the outer end of each tapering space section and opposite wall is double or more of that between the inner end of each tapering space and opposite wall.

7. The bearing seal system of claim 6 wherein an oil circulation hole to allow each tapering space section to communicate with each other is formed on an outer side of said bearing.

8. The bearing seal system of claims 1, 3 or 6 wherein a magnetic fluid is filled inside each tapering space section and a magnetic circuit is formed in that magnetic flux is strong at the inner end of each tapering space section and weak at the outer end of each tapering space section; the magnetic field of density gradient magnetic flux circuitry covering at least half of each tapering space section at a predetermined level and in a predetermined direction.

9. The bearing seal system of claims 1, 3 or 6 wherein more than ⅔ of the space of each tapering space section along an axial direction is formed as parallel space of dimension 0.4 mm or more.

10. A bearing seal comprising:

a thrust bearing which relatively rotatably supports a fixed member and a rotating member, said thrust bearing having a cylindrical groove extended in a radial direction and a thrust disk relatively rotatably inserted against said groove;

a hydrodynamic pressure generating groove curved on at least one of four surfaces defined by said thrust bearing, said four surfaces including an upper surface of said cylindrical groove, a bottom surface of said cylindrical groove, an upper surface of said thrust disk, and a bottom surface of said thrust disk;

two a tapering space sections which are formed on an inner radius side of two spaces defined by said four surfaces of said thrust bearing;

oil which is filled to the other tapering space section; and, a hole which is formed in said thrust disk in an axial direction to communicate with said tapering space sections formed on the inner radius side of said two spaces wherein:

(1) minimum space in each tapering space section is formed at an inner end of said tapering space section on said bearing section side and maximum space in each tapering space section is formed at an outer end of said tapering space section on an opposite side of said bearing section;

(2) a slope angle is defined between each tapering space section and an opposing surface, where said slope angle of each tapering space section, as viewed from the inner end of the tapering space section to the outer end of said tapering space section, is at least 0°;

(3) a distance between the outer end of each tapering space section and said opposing surface is 0.8 mm or less and the slope angle of each tapering space section is 45° or less;

(4) a total clearance in the axial direction in said thrust bearing is 200 μm or less; a total capacity of each tapering space section is at least 100% of a total capacity of said thrust bearing; the total capacity of each tapering space section is at least 30% of a total capacity from one of said tapering space sections to the other tapering space section, and a distance between the outer end of each tapering space section to the opposing surfaces is at least three times that from the inner end of said tapering space section to the opposing surface.

11. The bearing seal system of claim 10 wherein ⅔ or more of said tapering space section remains within the parallel space distance with 0.4 mm or less.

12. The bearing seal system of claims 6 or 10 wherein the hydrodynamic pressure generating groove is comprised to obtain the hydrodynamic pressure of the direction to cancel the centrifugal force which works on oil is canceled.

13. The bearing seal system of claims 1, 3, 6 or 10 wherein the oil quantity during the steady state is set between 0.1 A and 0.9 A position from the inner end of each tapering space section, when the capacity of each tapering space section is A.

14. The bearing seal system of claims 1, 3, 6 or 10 wherein the contact angle between said rotating or fixed member in each tapering space section and oil is at least 15°.

15. The bearing seal system of claim 14 wherein the difference in contact angle between said rotating or fixed member and oil is 15° or less.

16. The bearing seal system of claim 14, wherein the internal wall surface of each tapering space section is made of low-surface tension plastic material.

17. The bearing seal system of claim 14 wherein the surface roughness of the internal surface of each tapering space section is Ra 0.25 μm or less.

18. The bearing seal system of claims 1, 3, 6 or 10 wherein each tapering space section opens at 45° measuring from the inner end to the outer end of each tapering space section.

19. The bearing seal system of claim 18 wherein the average slope angle of each tapering space section is at least 10°.

20. The bearing seal system of claim 18 wherein the slope angle of the tapering space section is predetermined and its cross section of internal wall surface is constructed in straight lines.

21. The bearing seal system of claims 1, 3, 6 or 10 wherein the outer end of the hydrodynamic pressure generating groove formed on said bearing is extended to the inner end of each tapering space section.

* * * * *